(No Model.)

H. P. WILLIAMS.
CAR DUMP.

No. 514,800. Patented Feb. 13, 1894.

WITNESSES:

INVENTOR
H. P. Williams
BY
ATTORNEYS

UNITED STATES PATENT OFFICE.

HIRAM PRESTON WILLIAMS, OF SOMERDALE, OHIO.

CAR-DUMP.

SPECIFICATION forming part of Letters Patent No. 514,800, dated February 13, 1894.

Application filed April 25, 1893. Serial No. 471,785. (No model.)

*To all whom it may concern:*

Be it known that I, HIRAM PRESTON WILLIAMS, of Somerdale, in the county of Tuscarawas and State of Ohio, have invented a new and Improved Car or Wagon Dump, of which the following is a full, clear, and exact description.

My invention relates to a device especially adapted for dumping cars, wagons or other vehicles, and the object of the invention is to provide dumping mechanism upon which the car or other vehicle may be readily placed and secured in such manner that the load may be dumped from either side of the vehicle.

A further object of the invention is to provide a mechanism by means of which the dumping may be effected by the use of a motor, or through the power of one or two men.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in both the views.

Figure 1:
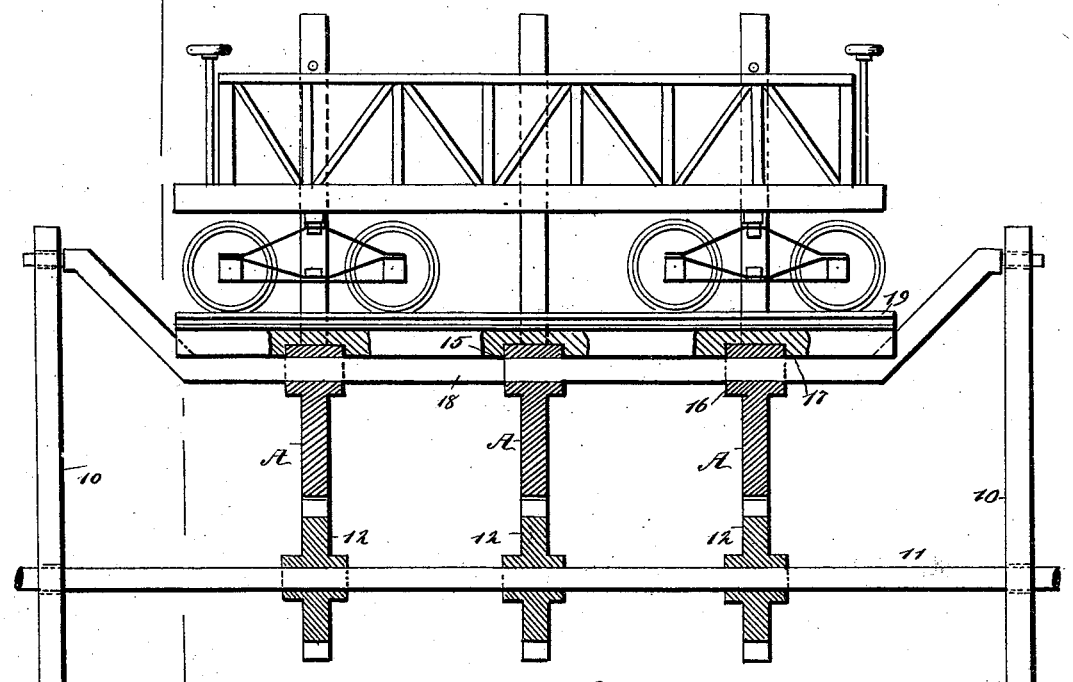
Figure 2:
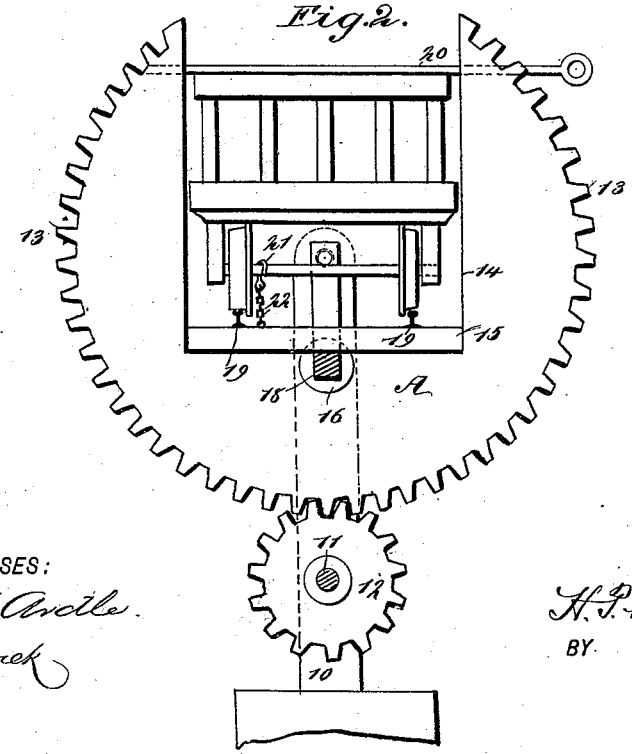

Figure 1 is a vertical central section through the cradles of the dumping mechanism, the supports of the mechanism and the car being shown in elevation; and Fig. 2 is a vertical transverse section taken essentially on the line 2—2 of Fig. 1.

The dumping mechanism is located between the uprights 10, which are secured permanently at their lower ends to any approved form of support. The uprights 10, however, may be substituted by a wall, or any equivalent object. In the lower portion of the uprights 10 a shaft 11, is journaled, and the said shaft has secured upon it a series of pinions 12, preferably three in number although any desired number may be used. Above each pinion a cradle A, is located. The said cradle is of practically circular shape, and is provided upon its periphery with teeth 13, the teeth of the cradle meshing with the teeth of the pinion immediately below them. The cradles are practically wheels, or they may be said to be of disk-like construction; and each cradle is provided with a recess 14, produced in its upper edge, which recess extends downward preferably to a point below the center, as shown in Fig. 2. The recess is practically rectangular, as shown in the same figure, or it may be of any desired shape. The various disks or cradles are connected by means of a platform 15, which rests upon the base walls of the recesses 14, and the said platform extends any desired distance beyond the outer faces of the outer cradles. Ordinarily each cradle is provided with a hub 16, below its center; in fact the hub is located at the central portion of the base wall of the recess 14 in a cradle, and a portion of the hub rises beyond the base wall of the recess and is fitted in a suitable recess 17, made in the under face of the platform. By this means the platform is prevented from moving endwise. The platform and all of the cradles are pivotally connected with the supports or uprights 10, by means of a bar or beam 18. This bar or beam extends beneath the central portion of the platform and through the hubs of the cradles, and the extremities of the rocking beam or bar 18, are journaled in any suitable or approved manner in the said uprights 10, as shown in Fig. 1. Preferably, the central or body portion of the rocking beam or bar 18, is much lower than its extremities, and this peculiar construction is provided in order to overcome the top-heavy weight of the car to be dumped; but the rocking beam may be made straight and weighted to overcome the excessive top weight of the car.

Tracks 19, are laid upon the platform 15 when it is to be used for receiving railroad cars; and after the car has been run upon the platform, as shown in Fig. 1, its top will be below the upper edge of the cradles, as illustrated in Fig. 2; and in order to hold the car or other vehicle in place a pin 20, is usually passed through the upper portion of each cradle to an engagement with the top of the car, and a hook 21, attached to a suitable chain 22, said chain being secured to the platform, is passed over each axle of the car at the side opposite to that at which the dumping is to take place.

It will be observed that when a car is in position in the dumping device, by turning the shaft 11 in a proper direction, which may be accomplished by hand or by means of a motor, the cradles may be rocked over either to the right or to the left, and the load dumped from the car or other vehicle carried by the cradles without the slightest danger of the car or vehicle leaving the dumping device. In fact, the vehicle may almost be turned upside down.

Another short track or platform may be placed in position to form a bridge for the car from the termination of the permanent track to the track platform of the device. The dumping arrangement is exceedingly simple, it is durable and it is readily manipulated, and its manipulation may be accomplished with perfect safety to the vehicle to be dumped.

Having thus described my invention, I claim as new and desire to secure by Letters Patent—

1. A dumping device for cars and other vehicles, comprising a plurality of eccentrically mounted disk-like cradles, each having a recess in upper edge and teeth on its periphery, and a drive shaft provided with gear wheels meshing with the teeth of the cradles, substantially as described.

2. In a dumping device for cars and other vehicles, the combination with a drive shaft, and gear wheels thereon, of a plurality of disk-like cradles each having in its upper edge a recess extending below the center of the cradle, and teeth on its periphery, and a rock beam upon which the said cradles are eccentrically mounted, substantially as herein shown and described.

3. In a dumping device for cars and other vehicles, the combination with supports, and a drive shaft mounted in the supports and provided with gear wheels, of a plurality of disk-like cradles each having in its upper edge a recess extending below the center of the cradle, a hub in the base wall of the recess and teeth on its periphery, and a rock beam upon which the cradles are mounted having its ends bent upward and journaled in the said uprights, substantially as herein shown and described.

HIRAM PRESTON WILLIAMS.

Witnesses:
ISAIAH CRIST,
ABNER DICKSON.